Dec. 29, 1931.  J. N. MAGGOUS  1,839,039
AUTOMOBILE SIGNAL
Filed Aug. 20, 1930
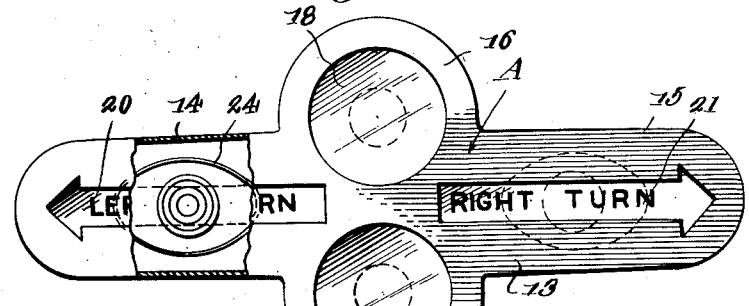
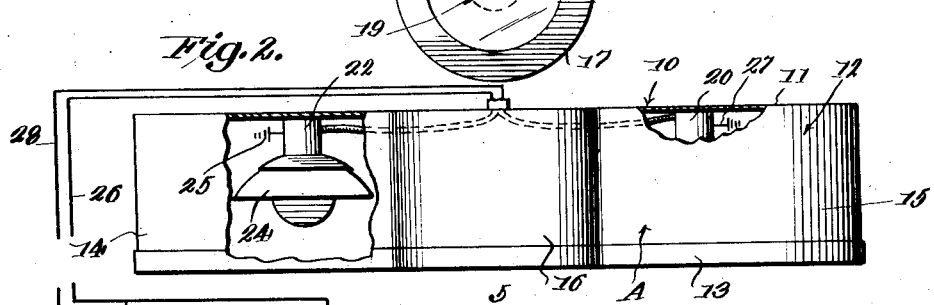
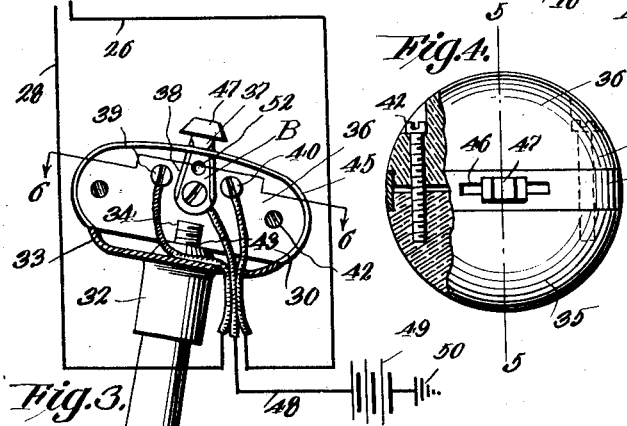
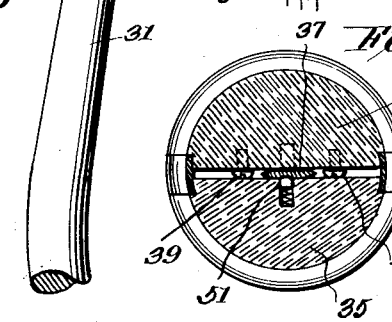
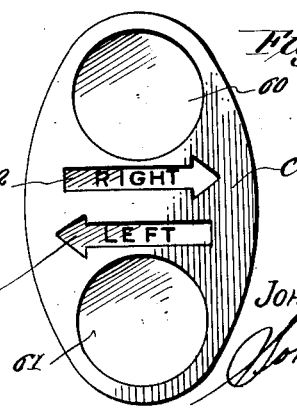
INVENTOR.
JOHN N. MAGGOUS
ATTORNEY Patented Dec. 29, 1931

1,839,039

UNITED STATES PATENT OFFICE

JOHN N. MAGGOUS, OF ANN ARBOR, MICHIGAN

AUTOMOBILE SIGNAL

Application filed August 20, 1930. Serial No. 476,670.

This invention appertains to direction signals for motor vehicles of the type wherein a signal casing having suitable direction indicia is attached at an appropriate point on the vehicle to be viewed by the traffic, with signal lights therein controlled by a switch located conveniently to the driver of the vehicle, the illumination of one of the selected lamps in the signal casing indicating to the traffic the intended change of course of the vehicle.

One of the primary objects of my invention is the provision of novel means for arranging the control switch for the direction signal directly in the ball or shift handle of the gear shift lever, whereby the switch can be quickly and easily actuated by the driver of the vehicle to close the circuit through the desired signal light without undue effort on the part of the driver of the vehicle.

Another salient object of my invention is the provision of novel means for incorporating the switch directly with the ball or handle of the gear shift lever of the vehicle, whereby the switch will form a part of said handle and be located at a convenient place thereon for quick and easy operation by the thumb or finger of the driver of the vehicle.

A further important object of my invention is the provision of novel means for constructing a control switch for a vehicle direction indicator directly with the ball or handle of the gear shift lever of the vehicle, the handle embodying a pair of solid half sections, with the switch mechanism arranged between the half sections and carried thereby, the sections being united in a novel manner, the switch lever having a thumb piece extending above the upper face of the ball or handle for quick manipulation.

A still further object of my invention is to provide a novel control device for vehicle direction indicators of the above character, which will be durable and efficient in use, one that will be simple and easy to manufacture, and one which can be placed upon the market and incorporated with a gear shift lever at a low cost.

With these and other objects in view, the invention consists in the novel construction, arrangement and formation of parts, as will be hereinafter more specifically described, claimed, and illustrated in the accompanying drawings, in which drawings:—

Figure 1 is an elevation of one of the preferred type of signal casing utilized in my invention, parts of the signal casing being shown broken away and in section.

Figure 2 is a top plan view of the same with parts of the casing broken away and in section.

Figure 3 is a fragmentary front elevation of the motor vehicle gear shift lever illustrating the improved control switch for the signal lights in the signal casing incorporated therewith.

Figure 4 is a top plan view of the handle or ball of the gear shift lever of the motor vehicle showing the switch incorporated therewith, parts of the handle or ball being shown broken away and in section.

Figure 5 is a section through the handle or ball of the gear shift lever taken on the line 5—5 of Figure 4.

Figure 6 is a horizontal section through the handle or ball of the gear shift lever taken on the line 6—6 of Figure 3 looking in the direction of the arrows, and Figure 7 is an elevation of another type of direction signal casing which can be utilized with my invention.

Referring to the drawings in detail, wherein similar reference characters designate corresponding parts throughout the several views, the letter A generally indicates a preferred type of direction signal casing adapted to be used in conjunction with an automobile to indicate the change of course of the automobile to the following traffic. As shown, this casing includes a body 10 having a rear wall 11, side walls 12 and a removable outer wall 13. This casing and its walls is so formed as to provide a pair of oppositely extending laterally disposed arms 14 and 15 and centrally disposed upper and lower light housings 16 and 17. The laterally extending arms 14 and 15 and the light housings 16 and 17 can be separated from one another by the use of suitable partitions (not shown). The cover 13 or outer wall 13 carries transparent glass plates 18 and 19 for the centrally disposed upper and lower housings 16 and 17. A signal light and suitable reflector is arranged in rear of each glass plate and the upper housing can constitute a stop light and the circuit for the lamp therein can be controlled by the usual foot brake pedal in the ordinary and well known manner. The lower housing 17 may constitute the usual tail light and illuminator for the license plate (not shown). The cover plate or outer wall 13 in front of the laterally extending arms 14 and 15 are provided with oppositely directed arrow shaped transparent panes 20 and 21, which can be of green color is preferred, in contrast to the red color of the glass plates 18 and 19 of the stop and tail lights.

Arranged in these arms in rear of the arrow shaped panes which indicate a turn respectively to the left and right, are lamp sockets 22 and 23 respectively, each of which can be provided with incandescent lamps and a reflector 24. One terminal of the lamp socket 22 is grounded as at 25 and the other terminal has connected thereto a wire 26. One terminal of the lamp socket 23 is grounded as at 27, and the other terminal has connected thereto a feed wire 28, and these wires 26 and 28 lead exteriorly of the signal casing as clearly shown in Figure 2.

As heretofore intimated, one of the salient features of my invention is the provision of the novel switch generally indicated by the reference character B for controlling the circuit to the signal light sockets 22 and 23.

As clearly shown in Figures 3 to 6 inclusive, this switch B is incorporated directly with and forms a part of the handle or ball 30 of the gear shift lever 31 of the motor vehicle.

The gear shift lever 31 receives the socket 32 of the concaved base plate 33 of the handle or ball of the gear shift lever and it is to be noted that the socket 32 carries a threaded screw 34 for engaging said ball or handle 30. The ball of the gear shift lever may be placed in any desired position, so as to permit the lever 37 to either swing from right to left or from front to back.

This ball or handle 30 is constructed in a novel manner in accordance with my invention and includes a pair of companion solid half sections 35 and 36 formed of any preferred material. The handle section 36 receives the switch lever 37, which is rockably mounted on a suitable pivot, such as a screw 38 anchored in said section 36. This lever extends outwardly above the upper face of the handle or ball 30 and on opposite sides of the switch lever 37 are placed contact points 39 and 40, which may be in the nature of screws anchored in the section 36. The companion half section 35 may have its inner face suitably recessed as at 41 to receive the pivot screw 38 and the contact screws 39 and 40, as clearly shown in Figure 5 of the drawings. These two half sections 35 and 36 of the handle or ball 30 of the gear shift lever 31 are connected together by the use of suitable retaining screws 42, and these sections are provided at their lower face with an axial threaded socket 43 for receiving the threaded screw 34 carried by the socket 32 of the concavo base plate 33. If desired, a finishing band 45 can be carried by the inner edge of one section, say the section 36 for overlapping engagement with the section 35. This finishing strip 45 hides the crevice between the two sections 35 and 36 and this finishing band is provided with a slot 46 through which protrudes the switch lever 37. The outer end of the switch lever 37 is provided with a suitable thumb piece 47 to facilitate the manipulation thereof.

The pivot screw 38 has electrically connected therewith a feed wire 48, which leads to one terminal of any suitable source of electrical energy such as the storage battery 49 of the vehicle. The other terminal of the storage battery 49 is grounded as at 50 to the frame of the vehicle. The wires 26 and 28 leading from the signal light sockets 22 and 23 are electrically connected respectively with the contact screws 40 and 39 as clearly shown in Figure 3 of the drawings. It is thus obvious that when the thumb piece 47 of the switch lever 37 is pushed forwardly into engagement with the contact screw 39, that the circuit will be closed through the signal light socket 23 and lamp carried thereby to indicate a turn to the right. When the switch lever 37 is moved to the rear into engagement with the contact screw 40 the circuit will be closed through the lamp carried by the signal light socket 22 indicating a turn to the left.

In order to hold the switch lever in a neutral position against accidental shifting movement, the handle section 35 of the gear shift lever can be provided with a spring pressed ball 51, for engaging in a suitable recess 52 formed in the switch lever.

As clearly shown in Figure 6 of the drawings, I prefer to have knife edges on the switch lever 37 so as to insure proper contact with the contact screws 39 and 40.

From the foregoing description, it can be seen that I have provided a novel form of switch for effectively controlling the signal lights in a signal casing for indicating a change or course of a motor vehicle.

In Figure 7 I have shown another form of signal casing, which can be utilized with my invention. This signal casing is generally indicated by the reference character C and embodies a stop light signal 60, a lower tail light 61, and indicating arrows 62 and 63 arranged between the stop light and tail light. As shown, these arrows 62 and 63 point in different directions for indicating the desired turn.

Changes in details may be made without departing from the spirit or scope of this invention, but:—

What I claim as new is:

1. A switch for vehicle direction indicators comprising a handle including a pair of companion half solid sections, a base plate receiving said sections, said sections being provided with a threaded socket, a screw carried by the base plate for engagement in the socket, a switch lever and a contact arranged on each side of the switch lever arranged between the half sections, the switch lever extending beyond said half sections, and a manipulating thumb piece on the outer end of the switch lever.

2. A switch for vehicle direction indicators comprising a handle including a pair of companion half sections, one of said sections having a switch lever pivotally connected thereto, a contact arranged on each side of the switch lever and connected to the inner face of the same handle section, a spring pressed pawl carried by the inner face of the other half section for engaging the switch lever when the same is in a neutral position between the contacts, removable means connecting said half sections together, the switch lever extending beyond the half sections, and a manipulating finger piece on the outer end of the switch lever.

3. A switch for vehicle direction indicators comprising a handle including a pair of companion half sections, one of said sections having a switch lever pivotally connected thereto, a contact arranged on each side of the switch lever and connected to the inner face of the same handle section, a spring pressed pawl carried by the inner face of the other half section for engaging the switch lever when the same is in a neutral position between the contacts, removable means connecting said half sections together, the switch lever extending beyond the half sections, a manipulating finger piece on the outer end of the switch lever, and a finishing band carried by one hand section engaging over the other half section having a slot therein through which the switch lever protrudes.

In testimony whereof I affix my signature.

JOHN N. MAGGOUS.